United States Patent [19]

Bose

[11] 4,235,845
[45] Nov. 25, 1980

[54] ANTI-AIR POLLUTION SYSTEM FOR EXHAUST GAS

[76] Inventor: Ranendra K. Bose, 1554 N. Danville St., Arlington, Va. 22201

[21] Appl. No.: 173

[22] Filed: Jan. 2, 1979

[51] Int. Cl.³ .............................................. B01D 50/00
[52] U.S. Cl. ...................................... 422/171; 55/405; 60/279; 60/902; 422/176; 422/183
[58] Field of Search ............... 422/169, 170, 171, 176, 422/177, 180, 183; 55/404, 405, 416; 60/274, 279, 402

[56] References Cited

U.S. PATENT DOCUMENTS

| | | | |
|---|---|---|---|
| 3,853,527 | 12/1974 | Andrews | 55/405 X |
| 3,857,484 | 12/1974 | Sudar et al. | 422/171 X |
| 3,861,142 | 1/1975 | Bose | 55/17 X |
| 3,892,070 | 7/1975 | Bose | 55/17 X |

*Primary Examiner*—William A. Cuchlinski, Jr.

*Attorney, Agent, or Firm*—Zalkind & Shuster

[57] ABSTRACT

The invention provides a pair of exhaust gas separation stages comprised in a gas separating vortex tube having an exhaust gas operated turbine impeller or rotor with stator wheels. The system combination also includes a mixing chamber for heavier and lighter combustible gas components subsequent to separation, wherein such components are directed to the top surface of a water charge in the mixing chamber, and further includes a chemical separation chamber downstream of the mixing chamber containing specified chemicals wherein the mixing chamber removes substantial parts of formaldehyde and nitrous oxides while the chemical chamber removes acetaldehyde and higher aldehyde components. Finally, the gas mixture from the chemical separation chamber passes through a water scrubber to remove traces of chemicals which may be used, to keep traces of chemicals in the chemical chamber from reaching the engine.

12 Claims, 1 Drawing Figure

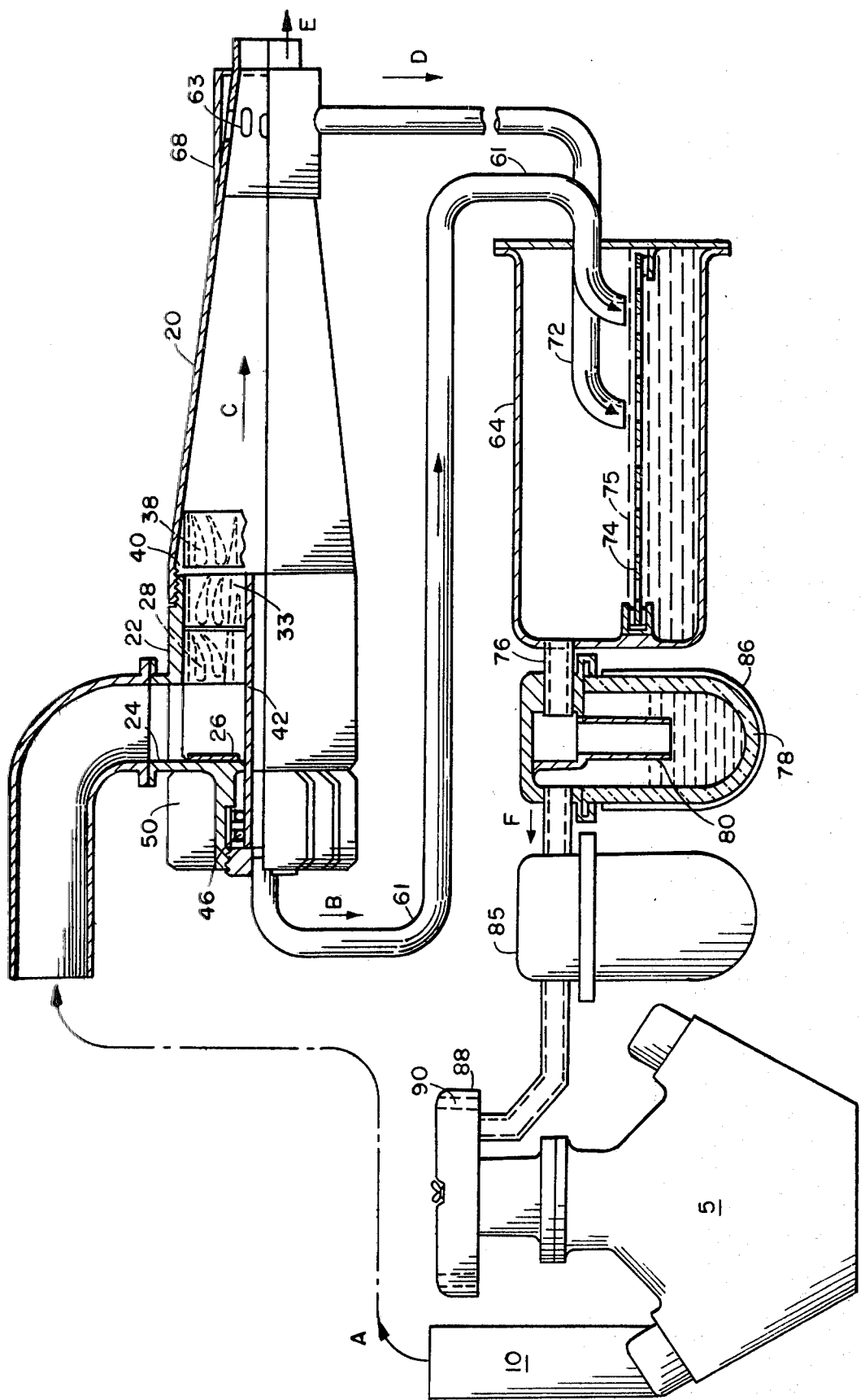

ANTI-AIR POLLUTION SYSTEM FOR EXHAUST GAS

The invention is an improvement over systems shown in my prior U.S. Pat. Nos. 3,861,142, issued Jan. 21, 1975, and 3,892,070, issued July 1, 1975, and Canadian Pat. No. 1,030,777. Both U.S. patents are incorporated by reference herein, the present disclosures being based thereon for information which need not be repeated in the disclosure herein.

In brief description of the aforementioned U.S. Pat. Nos. 3,861,142 and 3,892,070, which were copending, the earlier filed U.S. Pat. No. 3,892,070 shows and claims the basic combination of turbine impeller and conical vortex tube. Thus, an engine exhaust effects rotation of a turbine impeller which increases the speed of exhaust gas passing therethrough into the conical vortex tube wherein the whirling gas mass is centrifugally stratified into a core of lighter unburned combustible gases fed back from the larger end of the vortex tube to the engine while an outer layer of heavier gas exhausts at the smaller end to atmosphere. U.S. Pat. No. 3,861,142 improves the combination in salvaging from the component of heavier gas outer layer certain heavier combustible portions that are mixed with the separated lighter gas component and fed back to the engine, passing through a mixing chamber containing a water charge that removes pollutants such as aldehydes and nitrous oxides. A final portion comprising lighter non-combustible components of the heavier gas layer passes to exhaust at the smaller end of the vortex tube. U.S. Pat. No. 3,861,142 effects gas separation in two stages instead of the single stage shown in U.S. Pat. No. 3,892,070. Both teachings use a turbine impeller having dimensions based on a six-cylinder engine (Ford Fairlane, 1965, 200 c.i.d.) as noted in U.S. Pat. No. 3,861,142, and it will be appreciated that dimensional changes can be readily engineered for other engines dependent on number of cylinders and cubic displacement.

The present invention effects improvements over the teachings of my prior patents, based upon long experimentation and testing. Thus it was found that an increase in the number of blades on the turbine impeller to a multiple of twice the number of cylinders e.g., for an eight cylinder car sixteen blades on the impeller increased the velocity energy of the exhaust gases in the vortex tube by an increase in the energy conversion efficiency of the turbine. A stator wheel upstream of the turbine impeller with gas entry to the stator wheel reduces turbulence, and, more importantly, a stator wheel downstream of the turbine impeller overcomes an unexpected effect in operation of the invention, in that on test at about 1300 rpm in at least two different automobiles, i.e., six and eight cylinder engines, the turbine impeller was found to slow down. It was discovered that this was due to the exit gas from the impeller, when going into the vortex tube, was actually spinning in a reverse direction from the rotational direction of the impeller. The result was a slowing down of the separated lighter gas component in emerging at the larger end of the vortex tube. The advantages of this simple expedient of a downstream stator wheel which are unique to operation of the overall system will be subsequently described as to further benefits discovered.

As used in prototype experiments and testing, the impeller and stator wheels are of the shrouded type.

Further, in my prior patent, U.S. Pat. No. 3,861,142, a mixing chamber conducted gases to be mixed upwardly through a water charge. This was found to cause back pressure and under very cold conditions the water could freeze and stop system operation. In the present invention, the gases to be mixed are conducted to the surface of the water charge.

Gas analysis laboratory tests showed that certain higher aldehydes and acetaldehyde was present in the recycled gas mixture. A chemical separation chamber overcomes the problem and a water scrubber is used to remove chemical traces.

Referring to the FIGURE of the drawing, the alphabetical reference characters A–F designate the same gases or gas mixtures using the same reference characters as found in my prior U.S. Pat. No. 4,861,142, as follows:

| Arrow | Gases |
| --- | --- |
| A: | Exhaust from engine manifold, gas mixture of combustible and non-combustible gases, feed to rotate turbine impeller |
| B: | Lighter inner core of gas mixture comprising primarily combustible gas such as carbon monoxide, nitric oxide, ethylene, methylene, ethane, methane. |
| C: | Heavier of the heavy outer layer of gas mixture of combustible and non-combustible gases such as propane, butane, nitrogen dioxide and the lighter of the heavier gases such as carbon dioxide, water vapor with some traces of nitrogen oxide, butane, propane. |
| D: | Substantially a mixture of the heavier of the heavy gases, as above. |
| E: | Substantially a mixture of the lighter of the heavier gases, as above. |
| F: | Mixture of combustible light and heavy pollutants passing to carburetor air filter housing (through chemical separation stage and water scrubber to be described). |

In the FIGURE of the drawing, the exhaust manifold of engine 5 connects via pipe 10 to the inlet at the larger end of the vortex tube 20, there being a cylindrical housing 22 to which the conical vortex tube connects, and having entry port 24 connecting to pipe 10. Within such housing is a heat shield 26 and stator wheel 28 secured upstream of turbine impeller wheel 33 downstream of which is a further stator wheel 38 at the large end of the vortex tube secured on by welding as at 40.

It will be appreciated that suitable support for the impeller is provided on a hollow axial rotary shaft 42 extending up to the large end of the vortex tube and exteriorly of the cylindrical housing carried on a bearing 46 within the cylindrical housing the outer end of which is fashioned into a hub from which radially extend air cooling fins such as 50.

The cylindrical housing may, as shown, be a single integral casting along with the cooling fins with gas exhaust inlet port opening 24.

It will be apparent from the above description that exhaust gases from pipe 10 in the direction of arrow A enter stator wheel 28 where they are deflected to smoothly pass through to the impeller 33 effecting rotation of the impeller carried on the bearing 46 via shaft 42. In this instance, the gases enter into the impeller and emerge from stator 38 spinning in a direction to centrifugally stratify in the vortex tube 20.

Thus, the core of lighter gas mixture passes reversely through the hollow shaft 42, in the direction of arrow B, through pipe 61 to the mixing chamber 64. This effects the first separation stage. However, the mixture of heavier gases moves in the direction of the arrow C and, still rotating upon reaching the outer smaller end of the vortex tube 20, the heavier combustible gases emerge through the ports 63 into the second stage chamber 68 and then via pipe 72 in the direction of the arrow D to the mixing chamber 64. The lighter of the heavier gases which are non-combustible exhaust at the end of the vortex tube, arrow E.

Referring back to the stator 28, the placement of such a stator before a turbine impeller is of conventional practice. However, the placement of the stator 38 downstream of the impeller 33, while of apparent conventional practice, is by no means for the conventional effect found in gas turbines. In the present instance, it has been found to solve the problem wherein experimentation and testing brought to light the puzzling effect that the lighter gases through the pipe 61 were being slowed up for some reason or other at an engine speed of about 1300 rpm in at least two different test automobiles. It was ultimately discovered that the rotating gas mass leaving the turbine impeller blades was spinning in a direction opposite to the rotational direction of the impeller. It was further found that such opposite directional rotation was slowing down the lighter combustible gas mixture passing through pipe 61. Accordingly, in order to prevent such opposite rotation of a gas mixture leaving the turbine impeller, the stator 38 was added in order to redirect such gas mixture into the same rotational direction as the impeller. The result produced was that the passage of gas mixture in the core of the whirling gas in the vortex tube faces lesser flow resistance in passing through the sleeve 42 and the slowdown of flow in pipe 61 alleviated.

A further beneficial effect was found in the addition of the stator 38 in that it improved the separation quantity of the lighter gas mixture passing from the vortex tube through shaft 42 and likewise increased the quantity of heavier gas mixture passing toward the second separation stage 68. This is attributed to increased conversion of exhaust gas pressure energy into higher velocity energy effected by the presence of the stator 38. Thus, an overall improved separation effect was noted.

While still on the subject of the turbine, and whereas in my prior patent it was stated that the impeller should have a number of blades equal to the number of cylinders in the engine or a multiple thereof, it has now been ascertained that, by using a multiple of two, the impeller speed for a particular exhaust gas velocity is considerably increased. Thus, in actual experimentation with an eight-cylinder engine, it has been found that providing sixteen blades on the impeller considerably enhanced the rotational speed of the gases passing therethrough and by virtue of the stator 38 preventing opposite rotation of such gases, the greater rotational speed produced a stronger centrifugal separating effect between heavier and lighter gas components. However, it is not believed essential to double the number of blades on the stator wheels. The improved result taught herein was obtained with a downstream stator wheel of eight blades and a sixteen blade impeller as noted above, using a sixteen blade upstream stator wheel.

As hereinabove stated in connection with the mixing chamber 64, the lighter and heavier gases which are still combustible emerge from pipes 61 and 72 over a water bath for removal of formaldehyde and nitrous compounds, such as $NO_X$. In this instance, a catalytic plate 74 of zinc is carried in the water bath within the chamber approximately ¼" below the water surface 75 and is provided over its area with 3/16" apertures separated from each other by approximately ½"center to center. Such a catalytic plate was disclosed in my U.S. Pat. No. 3,861,142.

The particular structure of the chamber and the support means of the catalytic plate are of no patentable moment herein and any suitable construction is useable as well as emptying and filling fittings. However, it will be apparent that mixed gases in chamber 64 exposed to the water surface by being directed thereto cannot produce any back pressure as was found to be the case when bubbled upwardly therethrough, nor can freezing of the water block off flow of recycled gas mixture. Further, in the event of freezing of the water charge it will be apparent that the hot gases will very quickly cause melting and thus resumption of absorption by surface contact of formaldehydes and $NO_X$ soon resumed.

The gas mixture then passes from the mixing chamber 64 in the direction of the arrow F via a pipe 76 into a chemical separating chamber 78 which contains a solution of water and sodium hydroxide in molar strength with potassium dichromate in molar strength. The solution oxidizes higher aldehydes such as acetaldehyde to acetic acide, an effect not accomplished in the mixing chamber 64.

The reason for removal of such higher aldehydes is that they create a combustion inhibition problem in the engine and a consequent increase in hydrocarbon emissions. The problem increases due to efficiency of gas separation with the system of the present invention utilizing the stator wheel 38, since there is effected a greater amount of unwanted aldehydes due to the increase in combustible gas mixture.

The actual construction of the chemical separation chamber is similar to that of a water filter assembly used in compressed air lines for bubbling the gas mixture from mixture chamber 64 into a chemical solution which half fills a glass globe except that the filter as used in a compressed air line has been replaced by the open ended aluminum tube 80.

Downstream of the chemical separation chamber is preferably placed a water scrubber chamber 85 which is essentially the same construction as the chemical separation chamber but containing only water and serves to remove any chemical of the chemical solution that may have been entrained in the gas mixture so that it will not reach the engine where such chemicals may be harmful.

The globes of the chemical separation chamber and the scrubbing chamber are preferably jacketed as at 86 with heat insulating jackets, as shown, to deter freezing and both chambers are contemplated to be located in the engine compartment. Future development indicates that all chambers could be a single assembly unit.

Finally, the gas mixture feeds back preferably to the bottom of the air filter housing 88 and inside the air filter ring 90 where the recycled gas mixture of lighter and heavier constituents are picked up through the throat of the carburetor in engine operation.

An alternate method of gas input to the engine air intake could be through a vacuum control valve operated by engine manifold vacuum and set to open for recycled gas flow to the engine of between 13" and 16" of vacuum. Various other arrangements can be made. However, it has been found that the arrangement of the chemical chamber and the water scrubber leading to the bottom of the air filter through a conventional ¾" pipe within the filter ring produces easy admission and a reduced back pressure.

The best form of the invention presently known to me used a sixteen blade upstream stator, a sixteen blade impeller, and an eight blade downstream stator, all based, however, on experiments and tests with an eight-cylinder automobile. There is no reason to suppose that further experiment would not indicate different combinations and variations feasible or even better. For example, use of a sixteen blade downstream stator, and although I prefer to use an upstream stator which I believe improves results, it is conceivable that a tangential direct exhaust gas entry to the impeller, as shown in my prior patents, might produce acceptable results without the expense of the upstream stator.

Accordingly, I do not seek to be limited to the precise disclosure herein except as set forth in the appended claims.

What is claimed is:

1. In an anti-air pollution system for exhaust gas of the kind having a turbine impeller and a gas separation vortex tube for a first stage separation between combustible heavier and combustible lighter components of pollutant gases and a second gas separation stage for separating the non-combustible lighter constituent of the heavier combustible component gases for ultimate exhaust; wherein the lighter component moves in direction out of said vortex tube opposite to the direction of entry; and said system having means providing mixing of the lighter combustible component with the heavier combustible remaining component; the improvement which comprises: a stator wheel disposed downstream of the impeller for effecting downstream gas rotation in the vortex tube of said components in the same direction of rotation as said impeller whereby in said first separation stage lighter gases have reduced resistance to flow outwardly of said vortex tube.

2. In a system as set forth in claim 1, including the further improvement of a mixing chamber and means for conducting lighter and heavier combustible components thereto; said mixing chamber being adapted to hold a charge of liquid absorbent to absorb formaldehyde and nitrous oxide, said conducting means being disposed to conduct gas components to the surface of said liquid charge; including means to effect egress from said mixing chamber of mixed gases.

3. In a system as set forth in claim 2, including the improvement of a chemical separation chamber downstream of said mixing chamber and containing a solution of sodium hydroxide and potassium dichromate for oxidizing higher aldehydes by exposure of the gaseous mixture from said mixing chamber to said solution; including means of egress of said gaseous mixture from said chemical separating chamber.

4. In a system as set forth in claim 2, including the improvement of a chemical separation chamber downstream of said mixing chamber and containing a solution for removing higher aldehydes by exposure of the gaseous mixture from said mixing chamber to said solution; including means of egress of said gaseous mixture from said chemical separating chamber.

5. In a system as set forth in claim 4, including the further improvement comprising a scrubbing chamber downstream of said chemical separating chamber, wherein traces of chemicals entrained with gaseous mixture are removed; including means for egress of said gaseous mixture from said scrubbing chamber.

6. In a system as set forth in claim 5, including in said system an air filter container and air filter therein and connection means from said scrubbing chamber to said air filter container located to conduct gaseous mixture thereto within the confines of said filter therein.

7. In a system as set forth in claim 1, including the improvement comprising a stator wheel disposed upstream of said impeller.

8. In a system as set forth in claim 7, including the further improvement of a mixing chamber and means for conducting lighter and heavier combustible components thereto; said mixing chamber being adapted to hold a charge of liquid absorbent to absorb formaldehyde and nitrous oxide, said conducting means being disposed to conduct gas components to the surface of said liquid charge; including means to effect egress from said mixing chamber of mixed gases.

9. In a system as set forth in claim 8, including the improvement of a chemical separation chamber downstream of said mixing chamber and containing a solution for removing higher aldehydes by exposure of the gaseous mixture from said mixing chamber to said solution; including means of egress of said gaseous mixture from said chemical separating chamber.

10. In a system as set forth in claim 9, including the further improvement comprising a scrubbing chamber downstream of said chemical separating chamber, wherein traces of chemicals entrained with gaseous mixture are removed; including means for egress of said gaseous mixture from said scrubbing chamber.

11. In a system as set forth in claim 10, including in said system an air filter container and air filter therein and connection means from said scrubbing chamber to said air filter container located to conduct gaseous mixture thereto within the confines of said filter therein.

12. In a system as set forth in claim 7, including the improvement of a chemical separation chamber downstream of said mixing means and containing a solution of sodium hydroxide and potassium dichromate for oxidizing higher aldehydes by exposure of the gaseous mixture from said mixing means to said solution; including means of egress of said gaseous mixture from said chemical separating chamber.

* * * * *